US007398426B2

(12) United States Patent
Colyer (10) Patent No.: US 7,398,426 B2
(45) Date of Patent: Jul. 8, 2008

(54) METHOD FOR CAPTURING COMPUTER APPLICATION DIAGNOSTICS

(75) Inventor: Adrian Mark Colyer, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 742 days.

(21) Appl. No.: 10/434,505

(22) Filed: May 8, 2003

(65) Prior Publication Data

US 2004/0123187 A1 Jun. 24, 2004

(30) Foreign Application Priority Data

Dec. 19, 2002 (GB) ................... 0229669.7

(51) Int. Cl.
*G06F 11/00* (2006.01)
(52) U.S. Cl. ................... 714/38; 714/35; 714/37; 714/39; 714/45; 717/116; 717/165
(58) Field of Classification Search ............ 714/35, 714/37, 38, 39, 45; 717/116, 165; 711/116, 711/165
See application file for complete search history.

(56) References Cited

U.S. PATENT DOCUMENTS

| 5,615,333 | A * | 3/1997 | Juettner et al. ............ 714/38 |
| 6,467,086 | B1 * | 10/2002 | Kiczales et al. ............ 717/165 |
| 6,473,895 | B1 * | 10/2002 | Lopes et al. ............ 717/128 |
| 6,539,390 | B1 * | 3/2003 | Kiczales et al. ............ 707/101 |
| 6,826,746 | B2 * | 11/2004 | Evans et al. ............ 717/124 |
| 2003/0131147 | A1 * | 7/2003 | Wilt et al. ............ 709/321 |
| 2003/0149959 | A1 * | 8/2003 | Lamping ............ 717/116 |
| 2003/0149960 | A1 * | 8/2003 | Inamdar ............ 717/118 |
| 2004/0054695 | A1 * | 3/2004 | Hind et al. ............ 707/200 |
| 2004/0093581 | A1 * | 5/2004 | Nielsen et al. ............ 717/101 |

OTHER PUBLICATIONS

"Aspect-Oriented Programming" by G Kiczales et al, Proceedings of the European Conference on Object-Oriented Programming (ECOOP), Finland, Springer-Verlag LNCS 1241, Jun. 1997.
"Aspect-Oriented Programming with AspectJ" by I Kiselev, Chapter 2, pp. 15-37, published 2003 by Sams Publishing.

* cited by examiner

*Primary Examiner*—Robert W Beausoliel, Jr.
*Assistant Examiner*—Joseph D Manoskey
(74) *Attorney, Agent, or Firm*—Justin M. Dillon; Gregory K. Goshorn; Greg Goshorn, P.C.

(57) ABSTRACT

A diagnostic method in an aspect-oriented data processing environment is provided. The environment comprises a data processing system having an operating system for executing an application, wherein the application comprises an object class. The environment also comprises means for loading the object class at runtime and storage means for storing a diagnostic aspect. An aspect implements concerns (e.g. logging, security) that cross-cut the application. The object class of the application is loaded at runtime and the diagnostic aspect is read from the storage means. The means for loading now combines the object class with the diagnostic aspect, so that for example, diagnostics can be captured and repairs on the application can be carried out.

6 Claims, 7 Drawing Sheets

```
package com.ibm.amc.cal.aspects;

/**
 * This aspect injects tracing before and after all method calls in
 * the com.ibm.amc.cal package.
 */ aspect Trace { private static int indentLevel = -1;
   private static final String indent = "  ";

/**
    * all method calls are to be traced
    */ pointcut allMethods( ) : within( com.ibm.amc.cal.* );

/** trace entry to methods */
   before( ) : allMethods( ) {
      indentLevel++;
         for ( int i = 0; i < indentLevel; i++ ) { System.err.print( indent ); }
         System.err.println( "--> " + thisJoinPoint );
   }

/** trace exit from methods */
   after( ) : allMethods( ) {
         for ( int i = 0; i < indentLevel; i++ ) { System.err.print( indent ); }
         System.err.println( "<-- " + thisJoinPoint );
      indentLevel--;
   }

METHOD FOR CAPTURING COMPUTER APPLICATION DIAGNOSTICS

FIELD OF THE INVENTION

The present invention relates to the field of computer application diagnostics capture.

BACKGROUND OF THE INVENTION

In today's increasingly competitive market place, quality is of the utmost concern. Users' expectations are high and thus the reliability of hardware and software is especially important. Customers do not tolerate mistakes and the later a defect is discovered, the more costly it can prove to the manufacturer.

Software is undergoing a revolution in terms of complexity and therefore is becoming difficult to maintain. One area of complexity is the maintenance of "concerns". A concern is defined as a value, a responsibility, an area of interest, a common functionality and the like, for example, logging, quality of service, security, caching and buffering. During the software lifecycle, there is often a need separate concerns in order to improve maintainability, limit the impact of change, facilitate reuse and promote traceabilty.

Figure 2:
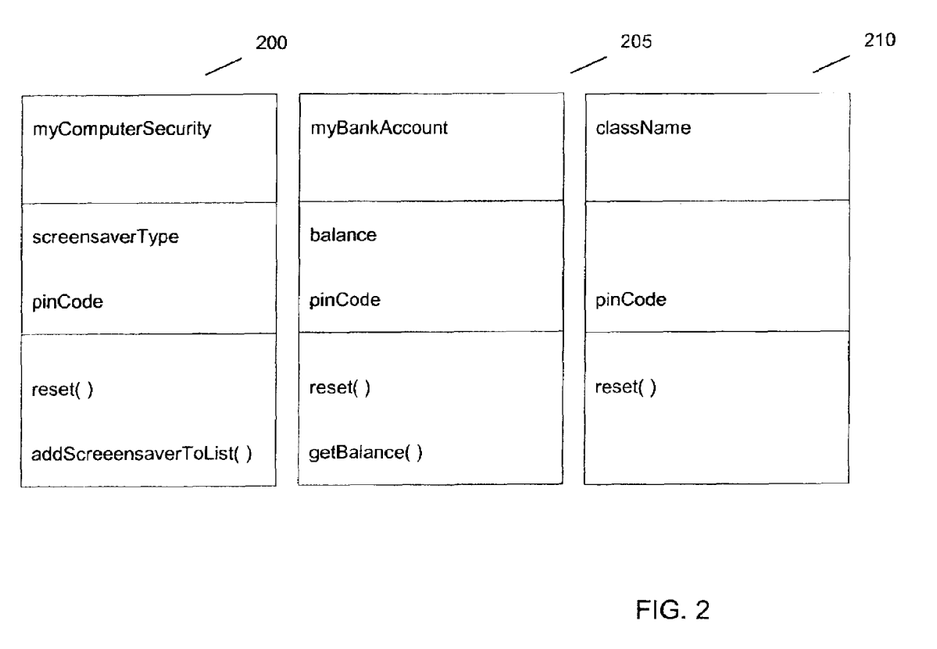
FIG. 2 shows a representation of concern implemented in a class hierarchy.

Object-oriented technology is one methodology that provides a partial solution to the problem, which will be discussed with reference to FIG. 2. A software object, referred to as an object, is an instance of a software class represented as an encapsulated software component comprising data attributes and functionality. The functionality within a software class is defined by software methods that are executed at run-time. Software classes are developed to represent abstract components of an object-oriented software application.

Programs written in the Java (Java is a trademark of Sun Microsystems Inc) programming language are generally run in a virtual machine environment, rather than directly on hardware. Thus a Java program is typically compiled into byte-code form, and then interpreted by the Java virtual machine (JVM) into hardware commands for the platform on which the JVM is executing. An important advantage of this approach is that Java applications can run on a very wide range of platforms, providing of course that a JVM is available for each platform.

A JVM includes components necessary to load Java classes and execute software methods written in the Java programming language. Java classes are written by programmers in the Java programming language using Java instructions. Java instructions are subsequently encoded as platform independent bytecodes by a Java compiler and stored in binary Java class files until they are executed. On execution, the JVM loads a Java class file into memory and executes the software methods it contains. To execute a software method the JVM decodes and executes the bytecode instructions for the software method using a Java interpreter. Decoding a bytecode instruction involves converting the byte code instruction into one or more appropriate machine code instructions for the computer platform. The machine code instructions are subsequently executed by the computer's processor. This model of operation ensures that Java classes are stored in platform independent bytecode format until execution, and these can thus be loaded and executed on many computer platforms given the presence of a JVM capable of interpreting bytecodes.

In an interpretive environment, such as Java, instances of software classes are created during application run-time as objects in an application. In the OO environment, in order to create a new object as an instance of a class, an application needs to obtain a definition of the class. Class definitions are typically stored within a data store in a computer system such as a hard disk drive. The application loads the class definition from the data store using a software routine called a classloader. Each software application has at least one classloader, and different software applications may have different classloaders. The class, once loaded, is also used to access instances of the class originating outside the application, such as objects passed from other applications as parameter objects. The class is uniquely referenced by the application using a combination of a name of the class (e.g. Logging.class) and a reference to a classloader (e.g. myLog.classLoader) which loaded the class. Only a class with the correct unique reference can be used by the application to access a software object instance of that class. A software object is accessible to an application if the application can access data attributes of the software object and invoke software methods of the object.

Figure 1:
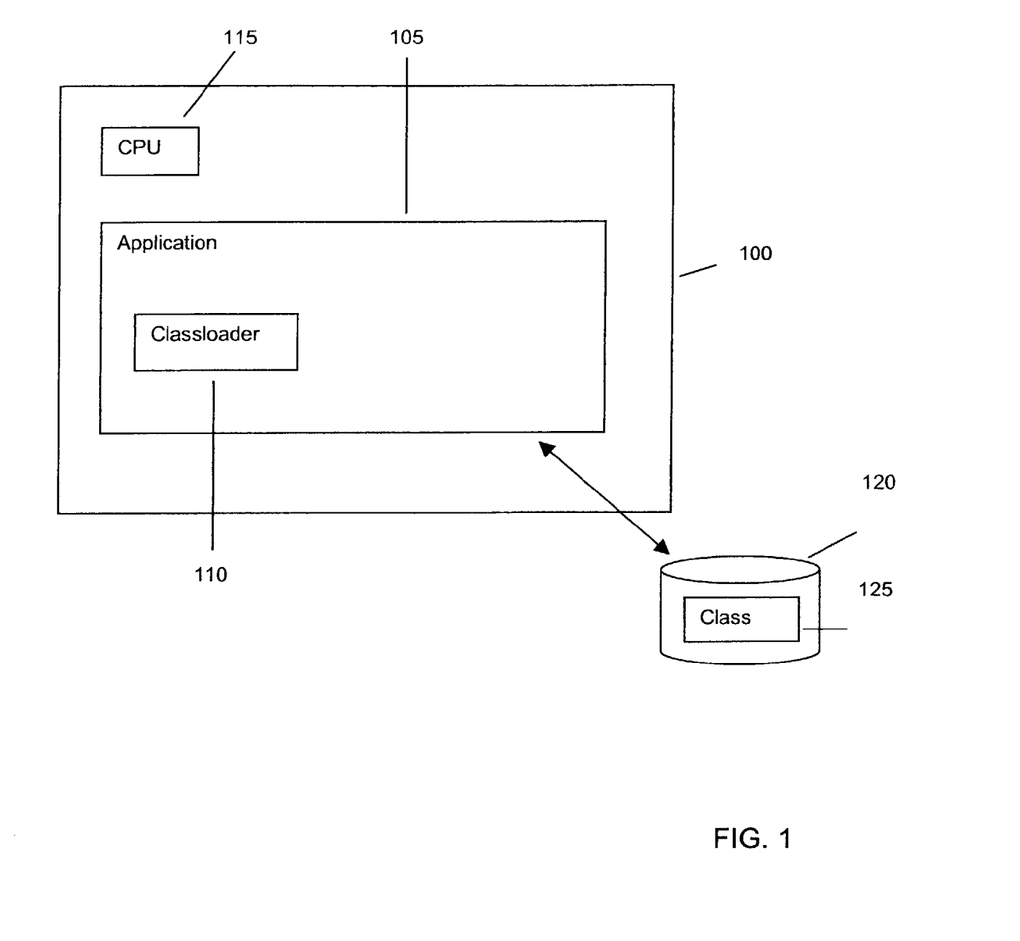
FIG. 1 shows a representation of a system used in prior art class loading.

FIG. 1 shows a computer system (100) that is used in the class loading process. The system (100) includes a central processing unit (CPU) (115) and a data store (120). The data store (120) is a non-volatile data storage medium such as a hard disk drive. An object-oriented class (125) is stored in binary format in data store (120). The class (125) is used to create software objects as instances of class (125) in an object-oriented application (105). The application (105) is an object-oriented application and includes a classloader (110). Alternatively, the classloader can be defined as part of the Java Runtime Environment. The classloader (110) is a software routine executable by the CPU (115). In use, the classloader (110) loads a software class from the data store (120) when the application (105) creates a new software object.

In OO the concept of modularity provides a way of identifying, encapsulating and manipulating concerns in a hierarchical architecture. In FIG. 2, a user manages "n" different class hierarchies ((200, 205 and 210)—only the parent classes, "ComputerSecurity", "BankAccount" and nth class "ClassName" are shown for simplicity). The dominant concerns in the system, for example computer security and bank accounts are cleanly encapsulated in the class hierarchy.

OO and other methodologies that exist are only advantageous in situations where there is a "clean" separation between concerns. In any non-trivial system there will also remain other concerns that do not fit neatly within the chosen decomposition, and hence their implementation is scattered across classes in the system. This is known as cross-cutting. Crosscutting poses many problems in program design, comprehension and maintenance. For example, in FIG. 2, the implementation of the PIN reset concern is scattered across several classes. It is difficult to modify that concern without incoherency arising. Identifying and modifying the concerns is time-consuming and the chances of causing errors increase.

Figure 3:
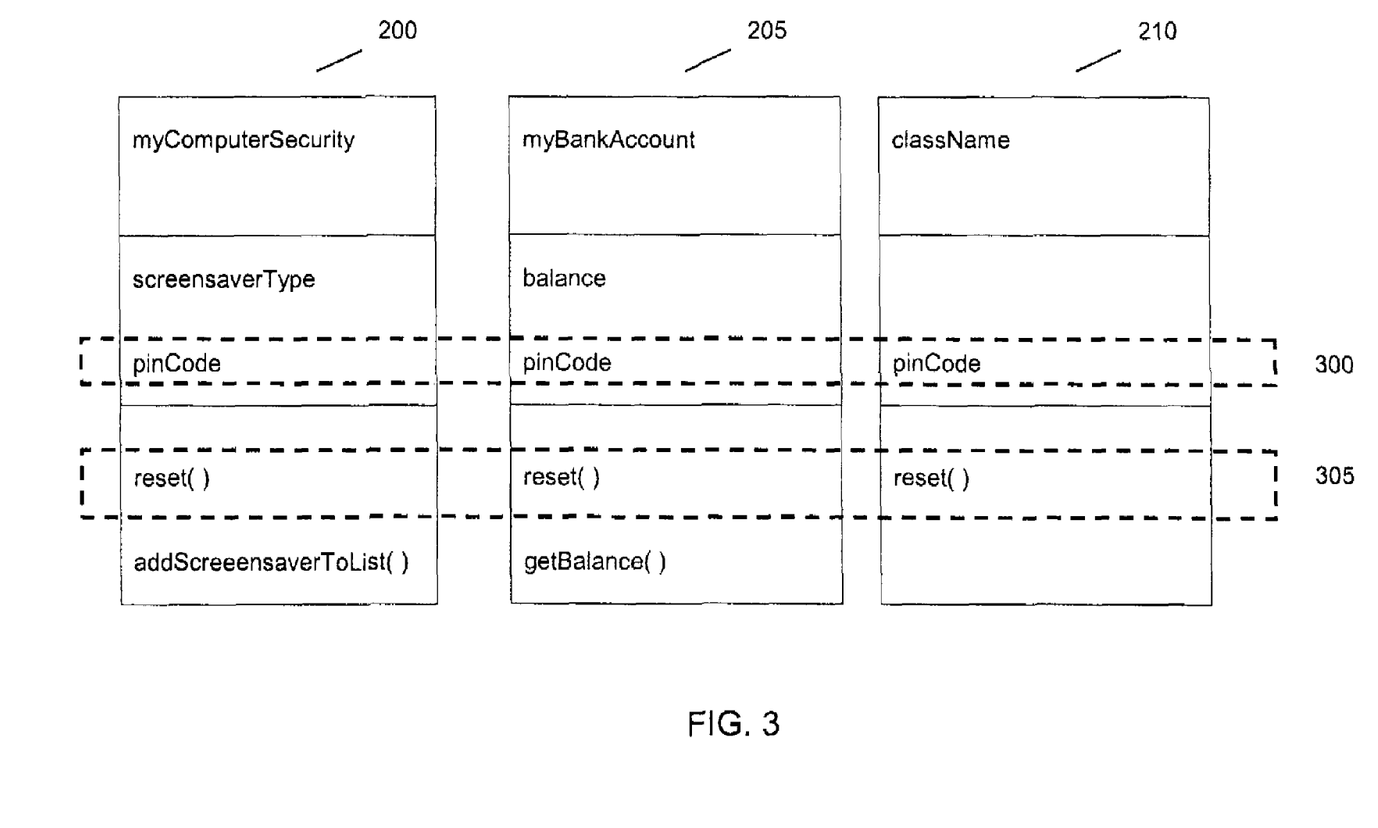
FIG. 3 shows a representation of cross-cutting concerns.

Aspect-oriented programming (AOP) as described by Gregor Kiczales et al. in "Aspect-Oriented Programming", ECOOP, June 1997 and in "Aspect-Oriented Programming with AspectJ" by Ivan Kiselev, Sams publishing, 2002 is a technique for improving the separation of concerns in software. The central idea in AOP is that while the hierarchical modularity mechanisms of object-oriented languages are extremely useful, they are inherently unable to modularise all concerns of interest in complex systems. AOP provides a way of modularising "cross-cutting" concerns, that is, concerns that are distributed across modules, code etc. Advantageously, cross-cutting concerns can be designed and programmed in a modular way, and thereby achieve the benefits of modularity. Such well modularised, cross-cutting concerns are called aspects (i.e. the implementation of a concern) and these allow programmers to implement changes to concerns in a modular manner. With reference to FIG. 3, classes 200, 205 and the nth class (210) are shown. With AOP, the cross-cutting concerns (300, 305), namely, the attribute pinCode and the method for resetting the PIN code, can be encapsulated in a single aspect, hence aiding the developer to modify the concern in a modular fashion.

The main concepts associated with AOP will now be described in more detail.

"Join points"—well defined points in the execution of a program. E.g. Field reference, exception handler execution, class initialisation, object initialisation.

"Pointcut"—identifies the join points that are to be involved in an operation.

"Advice"—code which is executed when a pointcut is reached. "Before advice" is executed before a given pointcut, "after advice" is executed after a pointcut and "around advice" is executed instead of join points picked by a pointcut.

"Weaving"—an aspect-oriented implementation technique that inserts advice code into the underlying application to be advised at the points indicated by pointcuts. Weaving is often performed by a compiler.

Figure 4:
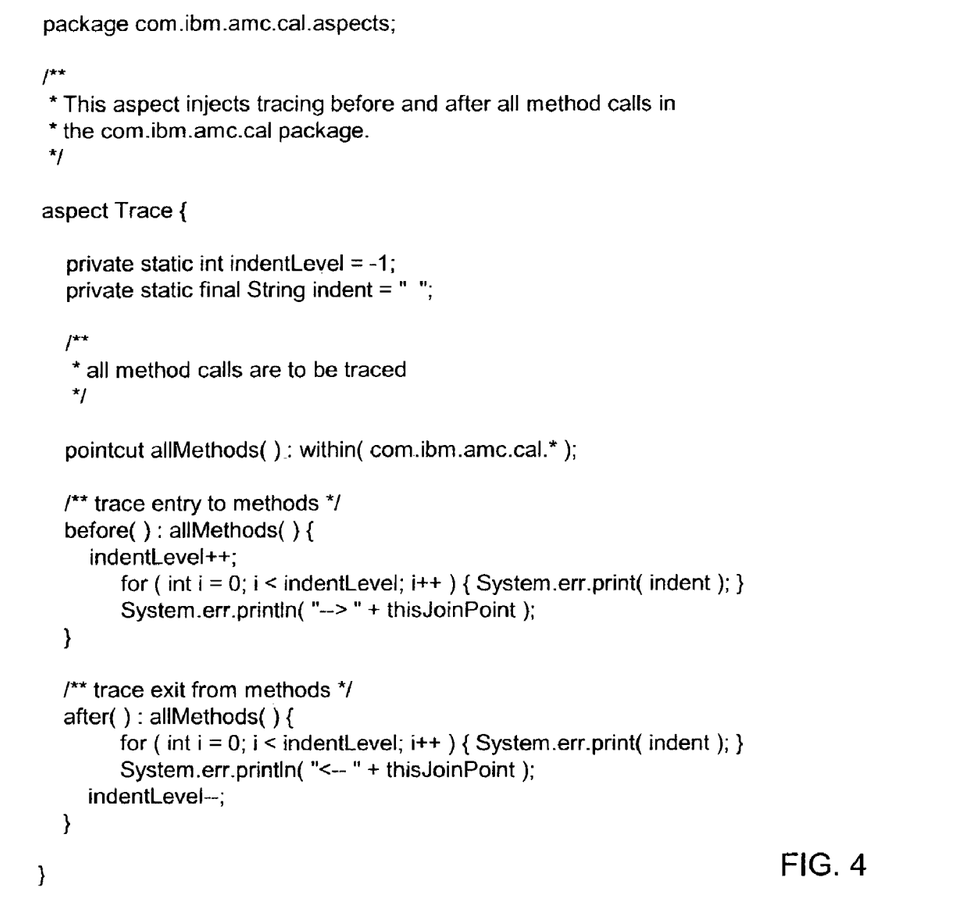
FIG. 4 shows an example of an aspect.

FIG. 4 shows an example of a program written in Java supplemented by AOP. The program is a calendar application contained in a Java package (i.e. com.ibm.amc.cal). The aspect (i.e. aspect Trace) is a cross-cutting concern that modularizes tracing across all methods. The pointcut (i.e. pointcut all Methods( )) identifies that all methods in the package are to be involved. The before advice shows the code to be executed before the pointcut and the after advice shows the code to be executed after the pointcut. In this example, a build time tool (e.g the ajc compiler in the aspect-oriented programming language, AspectJ) composes the aspect source file(s) (i.e. aspect Trace) with the target Java source files (e.g. programCode.java) to create Java class files (e.g. className.class).

In order to assist developers of computer programs or service personnel to determine the cause of a problem or the reason for unexpected behavior of a computer system, it is known to generate and store diagnostic information for subsequent analysis. The diagnostic functions built into a product are often inadequate for the service personnel to be able to capture accurate information about the problem. Often for example, diagnosis of a problem may require very detailed diagnostics in a particular subsystem and it is not appropriate to have this level of detail permanently built into the product. Furthermore, there is a need for diagnostics to be performed in an unobtrusive manner.

SUMMARY OF THE INVENTION

According to a first aspect, the present invention provides a diagnostic method in an aspect-oriented data processing environment comprising: a data processing system having means for executing an application and storage means for storing a diagnostic aspect for implementing concerns that cross-cut said application, wherein said application comprises an object class; said method comprising the steps of: loading said object class at runtime; reading said diagnostic aspect at runtime; and combining said object class with said diagnostic aspect at runtime.

It should be understood that the term diagnostics aspects herein refers to aspects used to capture diagnostics, aspects used to provide patches, fixes etc. and aspects to perform any other function associated with diagnostics. Preferably, the diagnostic aspect captures diagnostic data or repairs the application, or captures and repairs. In a preferred embodiment, the party supplying the aspects (e.g. a service provider) authenticates the aspects, for example, by using digital signatures and the party accepting the aspects (e.g. a customer) verifies the applied authentication before the aspects are combined with the application classes. Aptly, the diagnostic aspects are removed from the storage means after the combining step, which advantageously means that the application is left in its original state.

According to a second aspect, the present invention provides a diagnostic system in an aspect-oriented data processing environment comprising: a data processing system having an operating system capable of executing an application and storage means for storing a diagnostic aspect for implementing concerns that cross-cut said application; wherein said application comprises an object class; said diagnostic system comprising: a runtime loading component for loading said object class; a runtime reading component for reading said diagnostic aspect; and a runtime combining component for combining said object class with said diagnostic aspect.

According to a third aspect, the present invention provides a computer program comprising program code means adapted to perform all the steps of the above method, when said program is run on a computer.

For many systems, it is advantageous to perform aspect composition dynamically at runtime, instead of statically at compilation time. In a Java environment, this requires a class file or equivalent representation of an aspect (e.g. aspectName.class) and a mechanism to compose aspects with class files of compiled Java classes (e.g. className.class). In one possible implementation, the set of defined aspects are registered with a classloader, which is then used to load and execute the application as normal. On loading the classes, the classloader dynamically weaves the defined aspects with the original bytecodes of the Java classes resulting in the enhanced application. In a Java environment, a method for registering aspects can be added to as a subclass of the classloader. It should be understood that components for loading, reading and weaving do not have to reside in one entity (i.e. the classloader).

Advantageously, the aspects that capture the required diagnostics and provide patches are relatively small files and therefore result in a decrease in network overhead when they are shipped. Furthermore, the aspects work on the actual customer environment and do not perturb the existing application installation in any way. Beneficially, the application does not have to be recompiled, since aspects are weaved in at runtime. A mechanism is provided so that an application or product in the field can be non-intrusively instrumented to capture additional diagnostics on a case-by-case basis. This enables service personnel to devise a set of diagnostics specific to a problem, and have those diagnostics captured in place, in the field, at the site of the problem.

BRIEF DESCRIPTION OF THE DRAWINGS

The present invention will now be described, by way of example only, with reference to preferred embodiments thereof, as illustrated in the following drawings.

DETAILED DESCRIPTION OF THE INVENTION

Figure 5A:
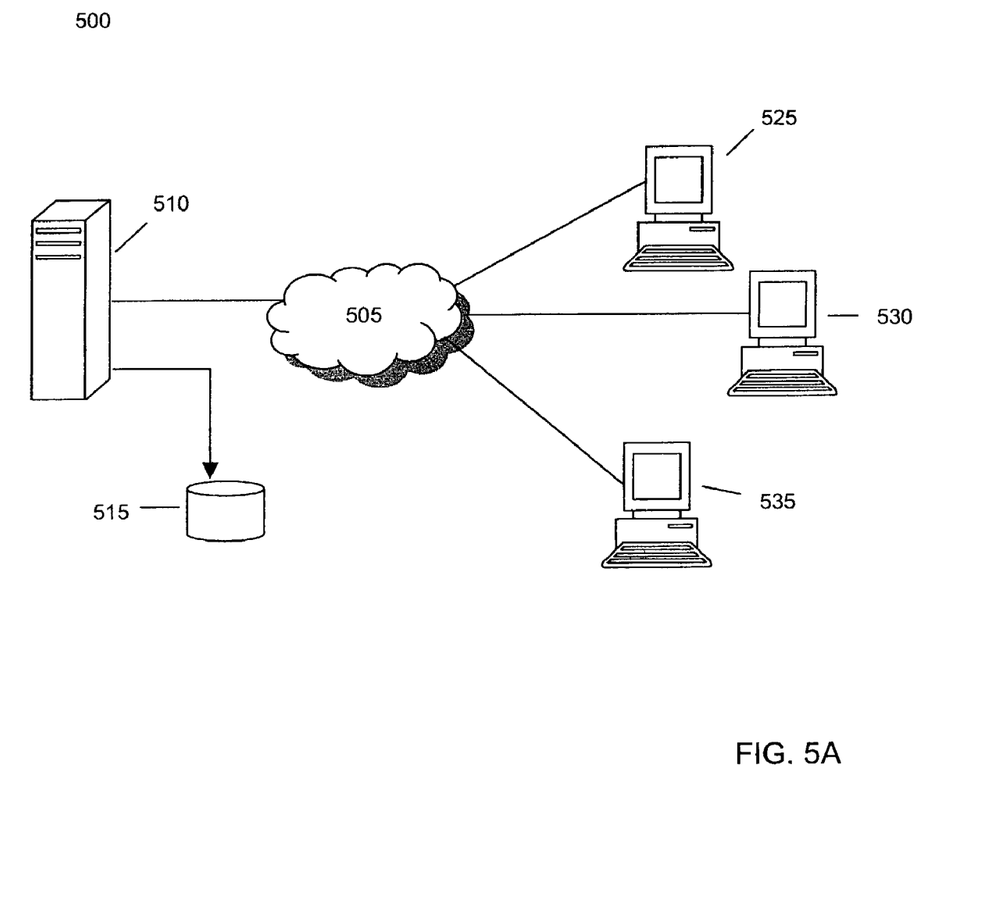
FIG. 5A shows a prior art distributed data processing system in which the present invention may be implemented.

FIG. 5A shows a pictorial representation of a distributed data processing system (500) in which a preferred embodiment of the present invention may be implemented. The distributed data processing system (500) comprises a number of computers, connected by a network (505). The server computer (510) has an associated storage unit (515) and is connected to the network (505) along with other server or client computers (525, 530 and 535). In the depicted example, the distributed data processing system (500) is the Internet, with the network (505) representing a world-wide collection of networks and gateways that use the transmission control protocol over internet protocol (TCP/IP) suite of protocols to communicate with one another.

Figure 5B:
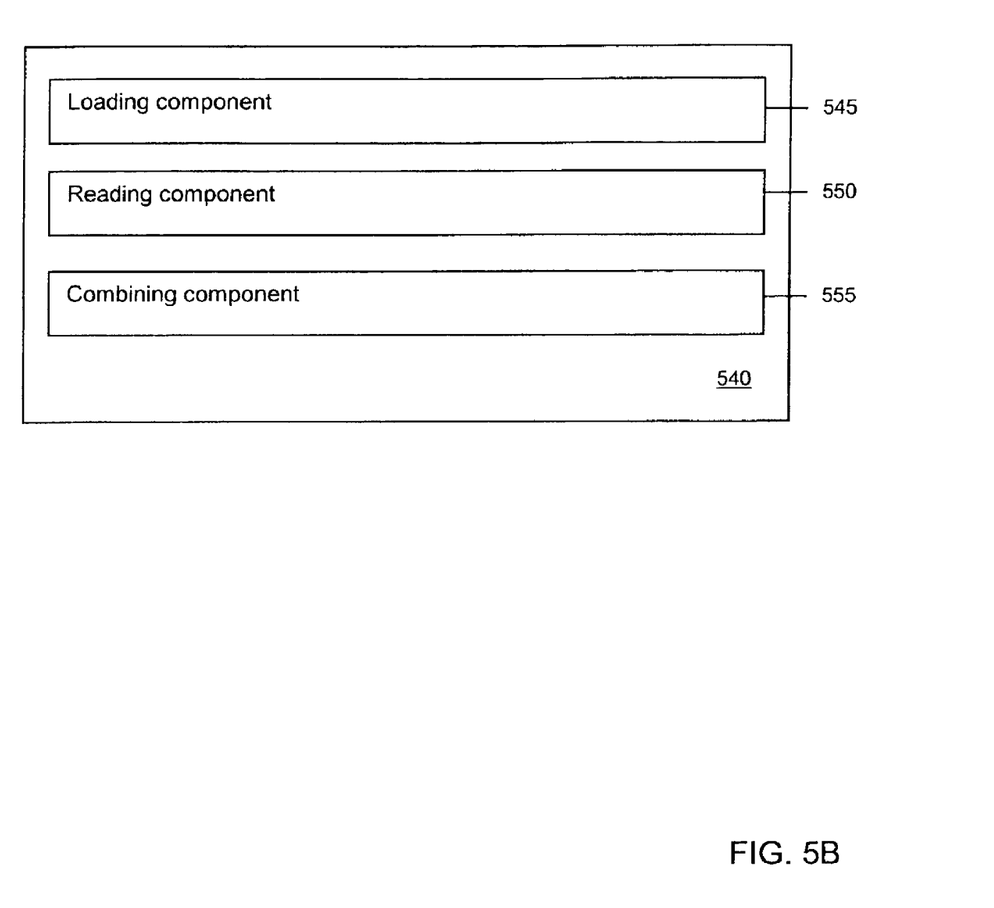
FIG. 5B shows the components of an aspect-enabled class loader.

For many systems, it is advantageous to perform the aspect composition dynamically at runtime, instead of statically at compilation time. In a Java environment, this requires a class file or equivalent representation of an aspect (e.g. aspectName.class) and a mechanism to compose aspects with class files of compiled Java classes (e.g. className.class). In one possible implementation, the set of defined aspects are registered with a classloader, which is then used to load and execute the application at runtime as normal. On loading the classes, the classloader dynamically reads (at runtime) the defined aspects and weaves them (at runtime) with the original bytecodes of the Java classes resulting in the enhanced application. In a Java environment, a method for registering aspects can be added to as a subclass of the classloader. FIB 5B shows an overview of an aspect-enabled classloader (540) comprising a loading component (545) for loading classes, a reading component (550) for reading aspects and a combining component (555) for combining the classes with the aspects. It should be understood that the components do not have to reside in one entity (i.e. the classloader).

The "aspect-enabled" classloader keeps track of all the aspects, which have been registered with it. The behavior of the standard loadclass method in the classloader is overridden so that any classes that it subsequently loads are composed with all the registered aspects before being passed to the JVM. Preferably, this composition occurs at the bytecode level—the bytecodes from the compiled and registered aspects being inserted into the loaded class files at the appropriate points.

In the description, the server computer (510) is run by a service provider, which supports a customer's computers (525, 530 and 535). The computers run in the Java environment. In a preferred embodiment a computer (525) comprises the system shown in FIG. 1, whereby an application (105) provided by the service provider is executed, the application being encoded as Java bytecodes (class files). Furthermore, in this example, the computer (525) utilizes the aspect-enabled classloader (540) as described above.

Using the above system as an example, currently, in order to gather additional diagnostics about a problem occurring with the application (105) on the computer (525), service personnel need to create a replacement jar file (which is the packaging format for Java classes), whereby the jar file comprises patches, fixes etc. for the application code. The new jar file is sent from the server (510) to the customer as a replacement for an existing jar file. This method has several disadvantages, for example, building of a whole product jar file is very complicated business, especially one that contains temporary instrumented code. Furthermore, the new jar file may be large to ship across the network (505). Additionally, the new jar file must match the customer environment (e.g. all the updates a customer has applied) exactly in order to reliably reproduce the problem and determine a solution—this can be very difficult. Another disadvantage is that the process of replacing the existing jar file with the new jar file is error prone, as is restoring the system to its prior state afterwards.

Embodiments of the present invention provide a more efficient and less obtrusive method of diagnosing problems. One embodiment of the present invention is shown with reference to FIG. 6. Firstly, a customer contacts the service personnel once a problem in the application (105) has been identified (step 600). The service personnel write (step 605) an aspect or a set of aspects that will capture diagnostics particular to that problem. For example, if a problem is occurring with the security settings of the application (105) (e.g. access level settings, PIN codes), an aspect is written to capture diagnostics about security across all classes associated with the application.

Figure 6:
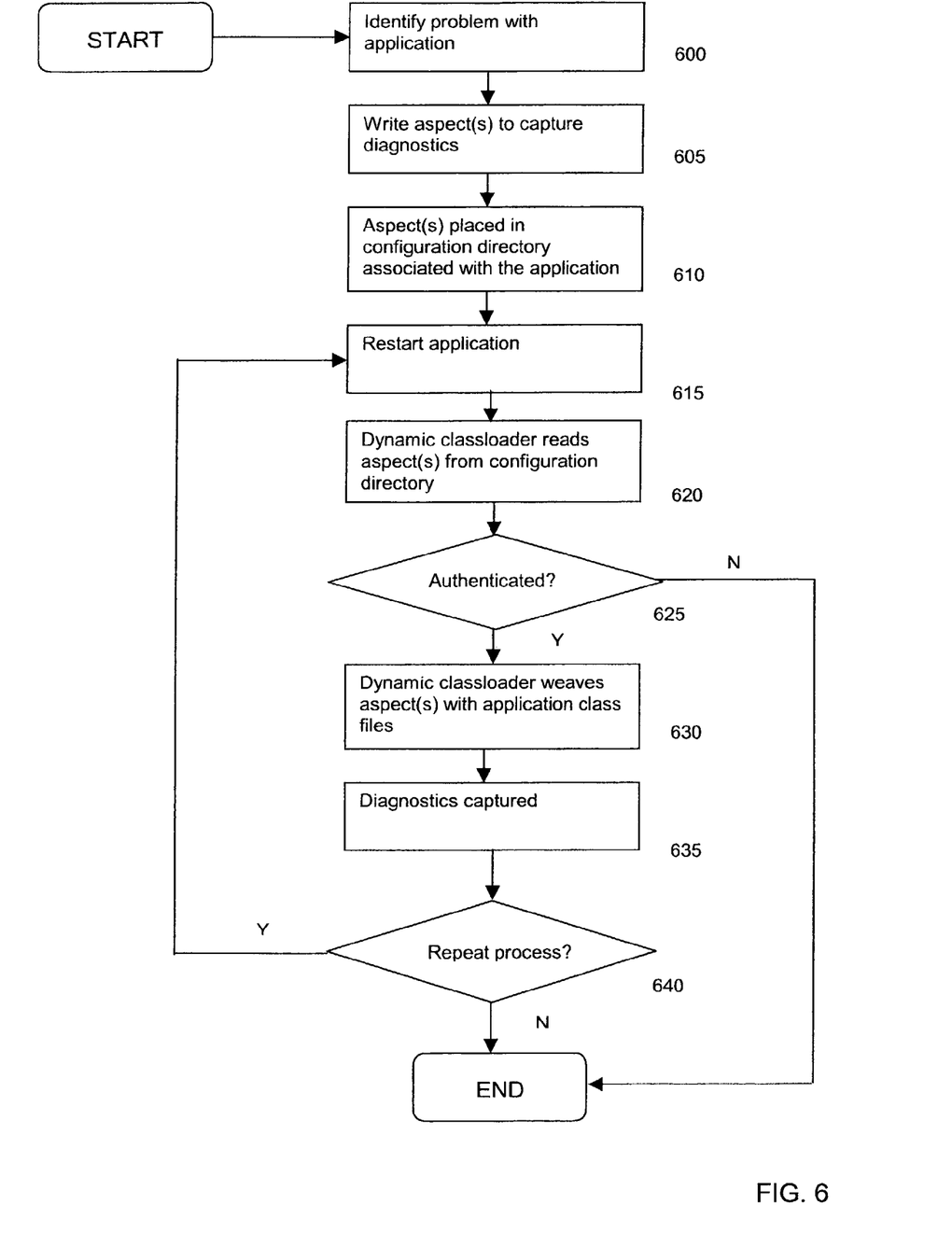
FIG. 6 is a flow chart showing the operational steps involved in one embodiment of diagnostics.

Preferably, the aspects are digitally signed and then sent to the customer, who places (step 610) these in a service directory (e.g. located in the data store (120)) that will be read by the classloader (540). The location of the service directory is preferably pre-determined as part of the application installation. Preferably, administrators are provided with the capability of selecting aspects that are to be applied to an application. Note that the aspects above need to be registered with the classloader (540).

Alternatively, instead of sending aspects to a customer, functionality can be added to the application itself, so that the customer can download the aspects from the service personnel over a network connection (505).

The application is now preferably restarted (step 615) and this causes the application classes to be reloaded by the classloader (540). Since the classloader is aspect-enabled, it applies the aspects found in the service directory to the application classes, as they are loaded.

Preferably this requires authentication (step 625) to be performed, that is, the digital signature of the aspects is verified to confirm the origin of the aspects. If authentication does not complete (negative result to step 625), preferably, the process ends in order to prevent third party tampering. However, if authentication succeeds (positive result to step 625), the classloader (540) weaves (step 630) the diagnostics aspects with the bytecodes of the application's Java classes at appropriate joinpoints.

As an example, an aspect is shown below. Before advice (which prints that the PIN is about to be reset) is executed before the all resetPincode methods (which may be scattered across multiple classes) are executed.

```
public aspect PinResetMonitor {
    pointcut pinResets( String pin ) :
        execution(boolean *.resetPincode( String ) ) &&
        args( pin );
    before( String pin ) : pinResets( pin ) {
        System.err.println( "About to reset pin to: " +
    pin );
    }
}
```

The application now runs with the instrumentation defined by the aspects so that diagnostics can be for example collected (step 635) and sent back to the service personnel for analysis. If the process is to be repeated in order to capture the same diagnostic information again (positive result to step 640), the process returns to step 615. Alternatively, after step 635, the diagnostics can be analyzed by the administrator and if required, adjustments can be made to the diagnostics to be collected. The process then returns to step 600, whereby new diagnostics can be collected. Returning to step 640, if no further analysis is required, the process ends.

Advantageously, the present invention also allows service personnel to develop a temporary patch for the problem once it has been identified. The patch can be tested in the customer environment in a non-intrusive way without the customer having to apply a patch directly to their core system. This is because the patch can also be written as an aspect or set of aspects, which can then be weaved with application classes at runtime. Therefore, the patch can be loaded with the application in the same way as the diagnostic capture aspects and furthermore can be applied to all affected portions of the application. Advantageously, the patch never affects the installed application code and can be harmlessly removed from the service directory if required. A further advantage is that after removal of the aspects, the application retains its state.

Preferably, the aspects that provide patches, fixes etc. utilize "around" advice to replace method body implementations with patched alternatives. As an example, an aspect is shown below, whereby the pinReset routine is replaced with a pinResetReplacementRoutine.

```
public aspect PinResetPatch {
    pointcut pinResets( String pin ) :
        execution(boolean *.resetPincode( String ) ) &&
        args( pin );
    boolean around( String pin ) : pinResets( pin ) {
        return pinResetReplacementRoutine( pin );
    }
    boolean pinResetReplacementRoutine( String pin ) {
        // perform new implementation
        return true;
    }
}
```

If the patches solve the problem, the customer can continue to operate with the temporary patch in place whilst the service personnel prepare an official patch and distribute it as an update to the application itself.

It should be understood that although embodiments using the Java programming language have been described, alternative embodiments of the present invention could be implemented in any interpretive programming environment.

Also, although embodiments using the AspectJ programming language have been described, alternative embodiments of the present invention could be implemented in any aspect-oriented programming environment.

The invention claimed is:

1. A diagnostic method in an aspect-oriented data processing environment comprising:
   a data processing system having means for executing an application and storage means for storing a diagnostic aspect for implementing concerns that cross-cut said application, wherein said application comprises an object class; said method comprising:
   loading said object class at runtime;
   reading said diagnostic aspect at runtime;
   combining said object class with said diagnostic aspect at runtime; and
   applying authentication to said diagnostic aspect.

2. A method as claimed in claim 1, wherein said diagnostic aspect captures diagnostic data.

3. A method as claimed in claim 1, wherein said diagnostic aspect repairs said application.

4. A method as claimed in claim 1, further comprising verifying the applied authentication is executed before said combining.

5. A method as claimed in claim 1, further comprising registering said diagnostic aspect.

6. A method as claimed in claim 1, further comprising removing said aspect from said storage means after said combining.

* * * * *